US007282879B2

(12) United States Patent
Miller

(10) Patent No.: US 7,282,879 B2
(45) Date of Patent: Oct. 16, 2007

(54) BI-DIRECTIONAL SENSING EDGE FOR GATE

(75) Inventor: Bearge D. Miller, West Grove, PA (US)

(73) Assignee: Miller Edge, Inc., West Grove, PA (US)

( * ) Notice: Subject to any disclaimer, the term of this patent is extended or adjusted under 35 U.S.C. 154(b) by 70 days.

(21) Appl. No.: 11/356,197

(22) Filed: Feb. 16, 2006

(65) Prior Publication Data

US 2006/0192682 A1 Aug. 31, 2006

Related U.S. Application Data

(60) Provisional application No. 60/653,598, filed on Feb. 16, 2005.

(51) Int. Cl.
*H02P 1/22* (2006.01)
*H02P 1/54* (2006.01)
*H02P 3/00* (2006.01)

(52) U.S. Cl. ...................... 318/266; 318/369; 318/283; 200/61.43; 49/27; 49/28

(58) Field of Classification Search ........ 318/260–266, 318/280–283, 466, 369; 200/61.43; 49/27, 49/28
See application file for complete search history.

(56) References Cited

U.S. PATENT DOCUMENTS

| | | | |
|---|---|---|---|
| 2,135,131 | A | 11/1938 | Bassett |
| 2,740,856 | A | 4/1956 | Doeg |
| 2,891,289 | A | 6/1959 | Guilbert |
| 3,133,167 | A | 5/1964 | Miller |
| 3,154,303 | A | 10/1964 | Cavallero et al. |
| 3,243,540 | A | 3/1966 | Miller |
| 3,260,812 | A | 7/1966 | Miller |
| 3,315,050 | A | 4/1967 | Miller |
| 3,321,592 | A | 5/1967 | Miller |
| 3,462,885 | A | 8/1969 | Miller |
| 3,509,360 | A | 4/1970 | Miller |
| 3,654,407 | A | 4/1972 | Kepner et al. |
| 3,693,026 | A | 9/1972 | Miller |
| 3,754,176 | A | 8/1973 | Miller |
| 3,855,733 | A | 12/1974 | Miller |

(Continued)

FOREIGN PATENT DOCUMENTS

DE 26 43 505 A1 3/1978

*Primary Examiner*—Paul Ip
(74) *Attorney, Agent, or Firm*—Akin Gump Strauss Hauer & Feld LLP

(57) ABSTRACT

A bi-directional sensing edge includes a mounting member for securing the sensing edge to a leading member of a gate. An elongate outer sheath has at least first and second portions each respectively corresponding to first and second sides of the leading member. An interior surface of the sheath is spaced from an outer surface of the mounting member to thereby define a second area. A first switch is complementarily positioned within the second area and corresponds to the first portion of the sheath for actuation of the first switch upon application of pressure on an exterior surface of the sheath substantially anywhere along the first portion. A second switch is complementarily positioned within the second area and corresponds to the second portion of the sheath for actuation of the second switch upon application of pressure on the exterior surface of the sheath substantially anywhere along the second portion.

11 Claims, 4 Drawing Sheets

U.S. PATENT DOCUMENTS

| | | | | |
|---|---|---|---|---|
| 4,051,336 | A | | 9/1977 | Miller |
| 4,090,045 | A | | 5/1978 | Marsh |
| 4,137,116 | A | | 1/1979 | Miller |
| 4,143,367 | A | | 3/1979 | Schestag |
| 4,273,974 | A | | 6/1981 | Miller |
| 4,396,814 | A | | 8/1983 | Miller |
| 4,401,896 | A | | 8/1983 | Fowler et al. |
| 4,497,989 | A | | 2/1985 | Miller |
| 4,773,155 | A | | 9/1988 | Buchien |
| 4,785,143 | A | | 11/1988 | Miller |
| 4,908,483 | A | | 3/1990 | Miller |
| 4,920,241 | A | | 4/1990 | Miller |
| 4,951,985 | A | | 8/1990 | Pong et al. |
| 4,954,673 | A | | 9/1990 | Miller |
| 5,023,411 | A | | 6/1991 | Miller et al. |
| 5,027,552 | A | | 7/1991 | Miller et al. |
| 5,072,079 | A | | 12/1991 | Miller |
| 5,079,417 | A | | 1/1992 | Strand |
| 5,299,387 | A | * | 4/1994 | Miller et al. .................... 49/28 |
| 6,600,113 | B1 | * | 7/2003 | Miller ..................... 200/61.43 |
| 6,689,970 | B2 | * | 2/2004 | Burgess et al. .......... 200/61.43 |
| 2003/0066741 | A1 | * | 4/2003 | Burgess et al. .......... 200/61.43 |
| 2003/0115802 | A1 | * | 6/2003 | Neubauer et al. .............. 49/28 |
| 2004/0107640 | A1 | * | 6/2004 | Ishihara et al. ................ 49/27 |
| 2004/0140186 | A1 | * | 7/2004 | Burgess et al. .......... 200/61.43 |
| 2006/0192682 | A1 | * | 8/2006 | Miller ..................... 340/686.1 |

* cited by examiner

BI-DIRECTIONAL SENSING EDGE FOR GATE

CROSS-REFERENCE TO RELATED APPLICATIONS

This patent application claims priority to U.S. Provisional Patent Application No. 60/653,598, filed Feb. 16, 2005, entitled "Bi-directional Sensing Edge for Gate", the disclosure of which is incorporated herein by reference.

BACKGROUND OF THE INVENTION

The present invention relates to a sensing edge for a gate and, more particularly, to a bi-directional sensing edge that senses the location of an obstacle and causes a moving gate to react by moving in a direction opposite to the direction of the sensed obstacle.

The use of sensing edges on moving gates is generally known. Such sensing edges generally include a sheath having an area therein wherein at least a portion of a switch is located. The sensing edge typically extends outwardly from the leading member of the gate in a direction of travel of the gate. Further, the sensing edge is typically attached to the leading member or pole of the gate by standard fastening methods, such as adhesives or screws. However, such sensing edges are problematic in that they cannot sense the exact location of a force and react accordingly. That is, while the prior art sensing edge will sense an applied force, a moving gate reacts to the force according to only one programmed result. This can be seen in U.S. Pat. No. 5,299,387.

Moreover, conventional sensing edges with a programmed reaction to an applied force create serious safety issues. For example, if the gate was programmed to move in a closing direction upon a force applied to the sensing edge, and a force was applied to the sensing edge by an object on the closing side of the gate while the gate was in an opening motion, the gate would reverse direction causing a potential collision with the object.

A need exists, therefore, for a sensing edge capable of sensing the location of an applied force and directing a gate to move in a direction opposite to the direction of the applied force.

The present invention is directed to an improvement of the sensing edge described in U.S. Pat. No. 5,299,387. Specifically, the present invention is directed to a sensing edge for causing a moving gate to move in a direction which is opposite to the direction of a force being applied to the sensing edge by actuation of a device. The sensing edge includes a mounting member which is shaped to snap-fit around a portion of the external surface of the leading member of the gate. The snap fit feature permits the mounting member to remain secured to the leading member of the gate in the event of a partial or total failure of additional fastening elements. The sensing edge extends sufficiently around the leading inside edges of the leading member of the gate to permit the device to be actuated in response to forces which approach the leading member at an angle or on the side thereof. Movement away from the force being applied is accomplished by having two separate sensing edges surrounding the mounting member where application of force on one sensing edge moves the gate in the direction of the other sensing edge.

BRIEF SUMMARY OF THE INVENTION

Briefly stated, the present invention is a bi-directional sensing edge for a gate. The gate includes a leading member having an external surface with at least first and second sides and a maximum lateral distance. The gate is movable in at least a first direction with the first side leading and a second direction with the second side leading. The sensing edge comprises a mounting member for securing the sensing edge to the leading member of the gate. The mounting member includes an outer surface and an inner surface defining a first area for receiving at least a portion of the leading member. An elongate outer sheath has at least first and second portions each respectively corresponding to the first and second sides of the leading member. The sheath further has an interior surface and an exterior surface. The interior surface of the sheath is spaced from the outer surface of the mounting member to thereby define a second area. A first switch is complementarily positioned within the second area and corresponds to the first portion of the sheath for actuation of the first switch upon application of pressure on the exterior surface of the sheath substantially anywhere along the first portion. A second switch is complementarily positioned within the second area and corresponds to the second portion of the sheath for actuation of the second switch upon application of pressure on the exterior surface of the sheath substantially anywhere along the second portion.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
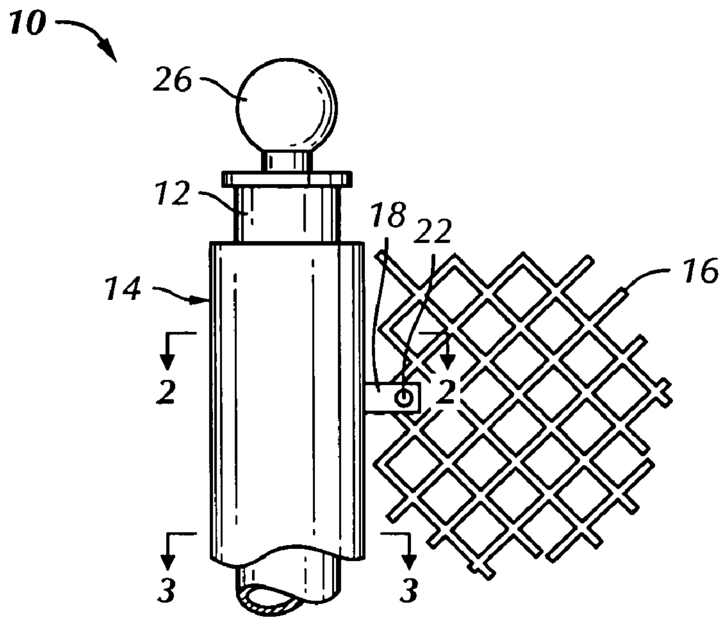
FIG. 1 is a partial front elevational view showing a portion of a gate construction including a sensing edge in accordance with a preferred embodiment of the present invention.

Certain terminology is used in the following description for convenience only and is not limiting. The words "right", "left", "lower" and "upper" designate directions in the drawings to which reference is made. The words "inwardly"

and "outwardly" refer to directions toward and away from, respectively, the geometric center of the sensing edge and designated parts thereof. Additionally, the word "a" as used in the specification means "at least one." The terminology includes the words above specifically mentioned, derivatives thereof, and words of similar import.

Referring to the drawings in detail, wherein like numerals indicate like elements throughout, there is shown in FIG. 1 a gate, generally designated 10, having a leading member 12 for receiving a bi-directional sensing edge 14. In the present embodiment, the gate 10 is automatically driven by a standard drive mechanism (not shown) and travels generally in an arcuate path between an open position and a closed position. Specifically, referring to FIG. 2, the leading member 12 has an external surface 28 with at least first and second sides 28*a*, 28*b* and a maximum lateral distance D. The gate 10 is moveable in at least a first direction X with the first side 28*a* leading and a second direction Y with the second side 28*b* leading. It is understood by those skilled in the art that the gate 10 may travel in a different direction, such as horizontally or vertically, for instance, without departing from the spirit and scope of the present invention. Mechanisms (not shown) capable of actuating the gate 10 are well-known to those skilled in the art and, therefore, further description thereof is omitted for purposes of convenience only and is not limiting.

Figure 2:
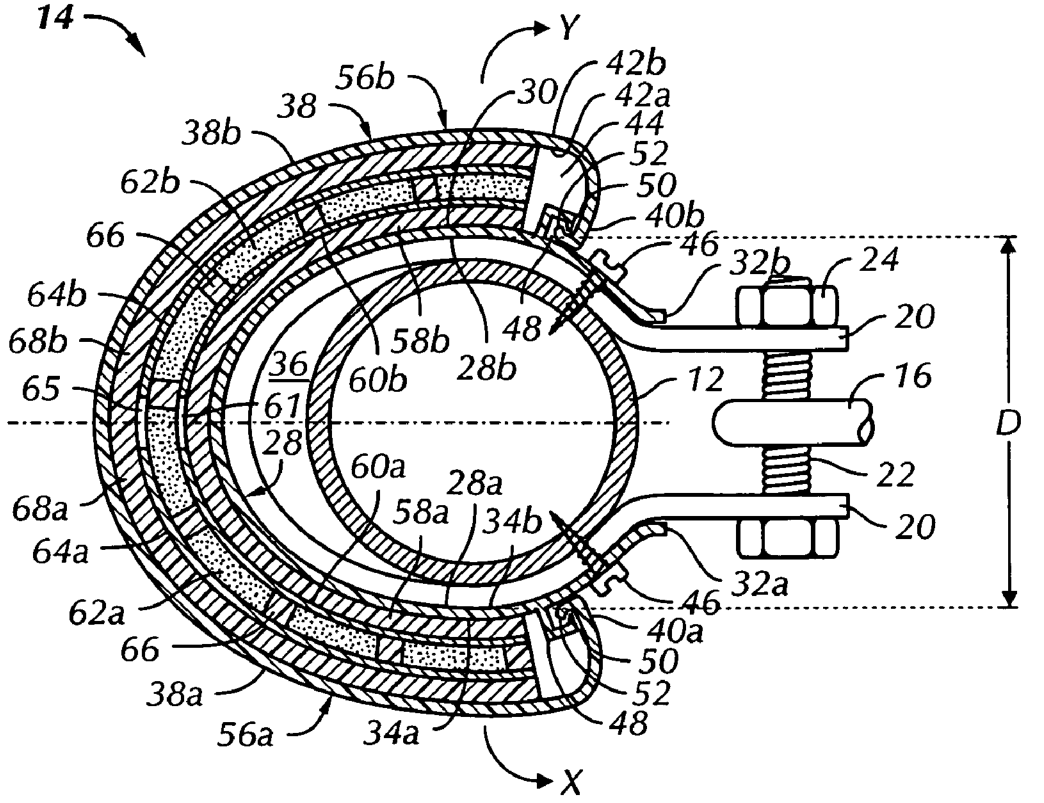
FIG. 2 is an enlarged cross-sectional view of the sensing edge of FIG. 1 taken along line 2-2 of FIG. 1.

As shown in FIGS. 1 and 2, the leading member 12 is preferably generally cylindrically shaped and has a predetermined outer diameter. A decorative element 26 is secured to the upper end thereof to provide the gate 10 with an overall aesthetically pleasing appearance. It is understood by those skilled in the art that the leading member 12 could be configured in other geometrical shapes, such as square, rectangular, or triangular in cross-section without departnment from the spirit and scope of the present invention and as described in more detail hereinafter in connection with the first and second alternate embodiments of the invention.

In the present embodiment, it is preferred that the body portion of the gate 10 be formed of chain-link type fencing 16, as is well understood by those skilled in the art. While in the present embodiment, it is preferred that the gate 10 be formed of the chain-link fencing 16, it is also understood by those skilled in the art that the present invention is not limited to mounting the sensing edge 14 to any particular type of gate 10, so long as the gate 10 includes a leading member 12 to which the sensing edge 14 may be attached. That is, the sensing edge 14 could be used in connection with a wooden stockade-type gate, picket fence-type gate, vertical sliding gate, horizontal sliding gate, swinging gate, bi-parting swinging gate, vertical pivot gate, cantilever gate, a pocket gate, or any other type of gate without departing from the spirit and scope of the present invention.

The chain-link fencing 16 is preferably secured to the leading member 12 by a series of brackets 18 (only one is shown) extending along the length of the leading member 12. In the present embodiment, it is preferred that the brackets 18 be elliptically shaped for receiving the generally cylindrical leading member 12 therethrough. The brackets 18 preferably include a pair of parallel legs 20 extending outwardly from the leading member 12. The distal end of each leg 20 includes an aperture for receiving a bolt 22. The bolt 22 preferably extends through the apertures of the legs 20 and through one of the links of the chain-link fencing 16 to thereby secure the chain-link fencing 16 to the leading member 12. The bolt 22 preferably includes a nut 24 to firmly secure the bolt 22 to the bracket 18. Other ways of attaching the leading member 12 to the chain-link fence 16 will be apparent to those skilled in the art.

Figure 3:
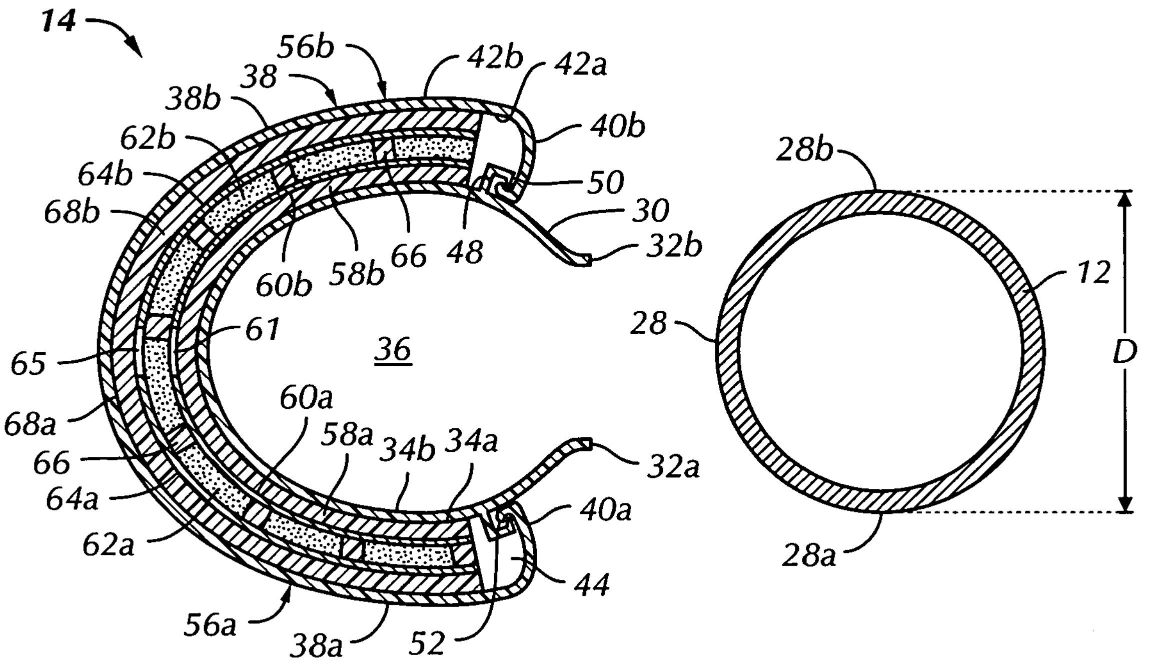
FIG. 3 is an enlarged cross-sectional view of the sensing edge of FIG. 1 taken along line 3-3 of FIG. 1, the sensing edge being shown separated from the gate.
Figure 5:
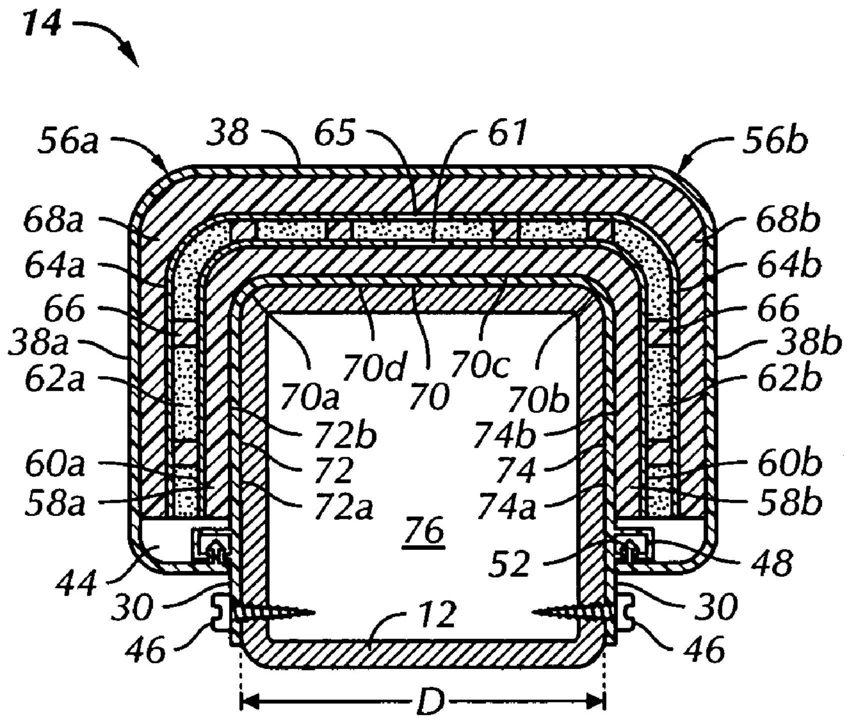
FIG. 5 is an enlarged cross-sectional view of a sensing edge in accordance with a first alternate embodiment of the present invention.
Figure 7:
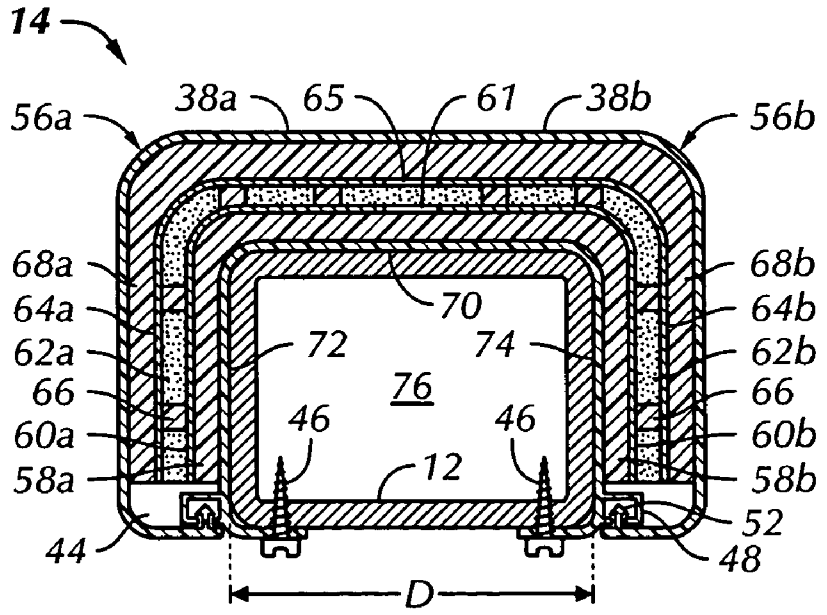
FIG. 7 is an enlarged cross-sectional view of a sensing edge in accordance with a second alternate embodiment of the present invention.

In the present embodiment, it is preferred that the leading member 12 include an external surface 28 for receiving the sensing edge 14. As shown in FIG. 2, the external surface 28 is formed by the outer surface of a curved bight portion of the bracket 18, or, between brackets 18, the external surface 28 is formed by the outer surface of the leading member 12, as shown in FIG. 3. It should be understood by those skilled in the art that, where the fence is of the type that the bracket 18 is omitted, the external surface 28 for receiving the sensing edge 14 is the external surface of the leading member 12, as shown in FIGS. 5 and 7.

While in the present embodiment, it is preferred that the sensing edge 14 be secured to the leading member 12 of the gate 10, it is understood by those skilled in the art that the gate 10 can include more than one sensing edge thereon. For instance, the sensing edge could be incorporate along the bottom edge of the gate 10, trailing edge of the gate 10, the crank arm of a moving gate, or the stationary portion of the fence proximate to the moving gate (all of which are not shown). By incorporating a sensing edge on different portions of the moving gate, the overall safety of the moving gate may be improved.

Figure 4:
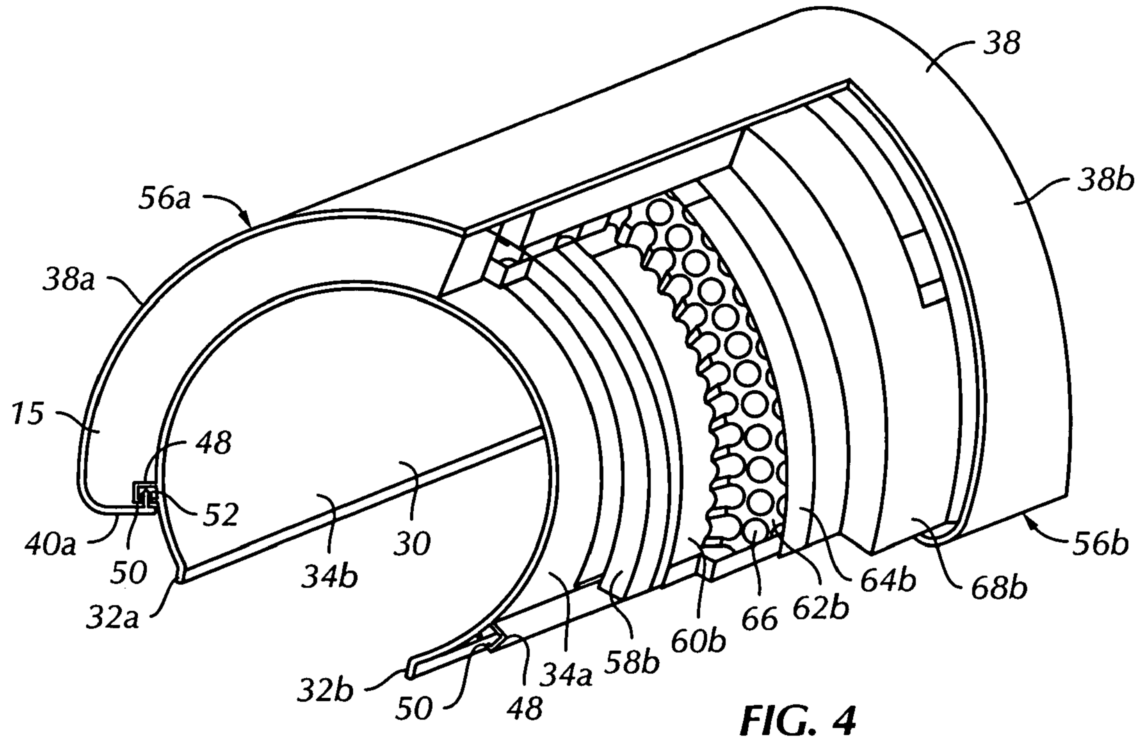
FIG. 4 is a perspective view, partially broken away, of a portion of the sensing edge of FIG. 1.

Referring now to FIGS. 2-4, the bi-directional sensing edge 14 includes a mounting member 30 for securing the sensing edge 14 to the leading member 12 of the gate 10. The mounting member 30 includes first and second lateral edges 32*a*, 32*b*. The first and second lateral edges 32*a*, 32*b* extend the entire length of the sensing edge 14 (i.e., vertically from top to bottom when viewing FIG. 1) which extends substantially the entire length of the leading member 12. The mounting member 30 further includes an outer surface 34*a* and an inner surface 34*b* defining a first area 36 for receiving in facing engagement at least a portion of the leading member 12. Preferably, the inner surface 34*b* of the mounting member 30 is sized and shaped to extend around at least a portion of the external surface 28 of the leading member 12 having the maximum lateral distance D. As used herein, the term leading member 12 includes either the leading member 12 per se or the brackets 18 in combination with the leading member 12. The inner surface 34*b* is preferably sized and shaped to extend around a sufficient portion of the external surface 28 of the leading member 12, such that the sensing edge 14 is sensitive to forces or objects in the direct path of the leading member 12 and at an angle thereto.

In the present embodiment, it is preferred that the first and second lateral edges 32*a*, 32*b* be spaced apart a distance which is at least slightly less than the maximum lateral distance D of the leading member 12. It is further preferred that the mounting member 30 be constructed of a material having a sufficient degree of flexibility to allow the lateral edges 32*a*, 32*b* of the mounting member 30 to move toward and away from each, such that the leading member 12 and brackets 18 can be snap-fit within the first area 36 to thereby frictionally secure the bi-directional sensing edge 14 to the leading member 12. In the present embodiment, it is preferred that the mounting member 30 be constructed of a semi-rigid, flexible polymeric material, such as polyvinyl chloride, which is preferably formed by an extrusion process. However, it is understood by those skilled in the art that the mounting member 30 could be constructed of other polymeric materials or metallic materials, as long as the requisite degree of flexibility and rigidity is provided to obtain the snap-fit so that the mounting member 30 effectively grips the leading member 12. Similarly, the mounting member 30 can be formed by other processes, such as die cast molding or compression molding.

Referring now to FIG. 2, the sensing edge 14 preferably includes an elongate outer sheath 38 having a first lateral edge 40*a*, a second lateral edge 40*b*, an interior surface 42*a*, and an exterior surface 42*b*. The first and second lateral edges 40*a*, 40*b* of the sheath 38 are spaced apart from each other and secured to the mounting member 30 proximate but slightly spaced from the first and second lateral edges 32*a*, 32*b* thereof. It is preferred that the first and second lateral edges 40*a*, 40*b* of the sheath 38 are releasably secured to the mounting member 30 to provide ready access to the below described components of the sensing edge 14 within the interior of the sheath 38. Further, the interior surface 42*a* of the sheath 38 is spaced from the outer surface 34*a* of the mounting member 30 to thereby define a generally C-shaped or arcuate-shaped second area 44 (when viewed in FIG. 2) for complementarily receiving first and second switches 56*a*, 56*b*, described hereinafter. The outer sheath 38 has at least first and second portions 38*a*, 38*b*, each respectively corresponding to the first and second sides 28*a*, 28*b* of the external surface 28 of the leading member 12 when the sensing edge 14 is assembled and attached to the leading member 12 as shown in FIG. 2.

In the present embodiment, it is preferred that the sheath 38 be constructed of a flexible material, such that the sheath 38 is easily compressible into the second area 44 upon application of external pressure thereto. It is preferred that the flexible material be a polymeric material, such as polyvinyl chloride, which is preferably formed by an extrusion process. However, it is understood by those skilled in the art that the sheath 38 could be constructed of other flexible materials such as Santoprene made by Monsanto or a combination of polyvinyl chloride and neoprene. Similarly, the sheath 38 can be formed by other processes such as die cast molding or compression molding.

Figure 6:
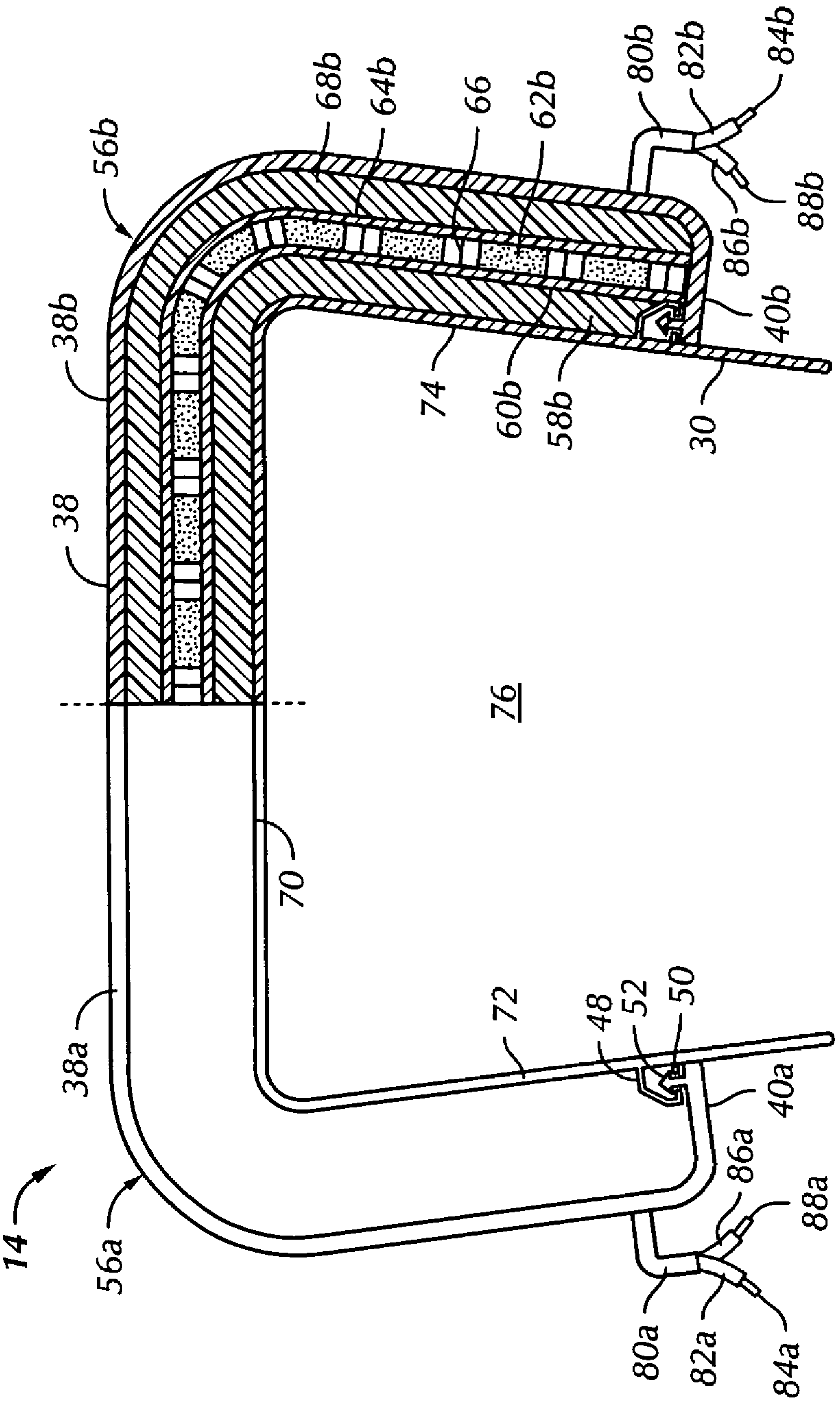
FIG. 6 is a partial cross-sectional view of the sensing edge of FIG. 5.

As shown in FIG. 2, the mounting member 30 and sheath 38 are preferably generally C-shaped or arcuate-shaped in cross-section for complementarily receiving the leading member 12 therein. However, it is understood by those skilled in the art that the sheath 38 and mounting member 30 could be constructed of other configurations to complement leading members of different shapes. For instance, as shown in the embodiments of FIGS. 5-7, the leading member is generally in the form of a parallelogram and the mounting member 30 and sheath 38 are generally U-shaped in cross-section to complementarily receive the leading member 12 therein. Referring now to FIG. 2, although the mounting member 30 is configured to receive and grip the leading member 12 with a snap-fit, it may be preferable to include one or more fastening elements to further secure the sensing edge 14 to the leading member 12. In the present embodiment, self-tapping screws 46 are provided for securing the lateral edges 32*a*, 32*b* of the mounting member 30 to the brackets 18 and/or leading member 12, as is understood by those skilled in the art. It is also understood by those skilled in the art that other fastening elements could alternatively be used to secure the mounting member 30 to the leading member 12, such as rivets (not shown) or an adhesive (not shown), without departing from the spirit and scope of the present invention.

Utilization of a snap-fit in combination with the standard fastening elements 46 provides a sensing edge 14 which is firmly secured to the leading member 12. That is, in the event that one or more fastening elements 46 fails, the snap-fit of the mounting member 30 retains the sensing edge 14 on the leading member 12 at least until the system is inspected and the fastening elements 46 are repaired or replaced.

As shown in FIGS. 2 and 3, the first and second lateral edges 40*a*, 40*b* of the sheath 38 are preferably releasably secured to the mounting member 30 to provide access to the second area 44, thus facilitating servicing, repair, and manufacture of the sensing edge 14. In the present embodiment, it is preferred that the first and second lateral edges 40*a*, 40*b* of the sheath 38 be releasably secured to the mounting member 30 by a snap-fit arrangement. That is, the outer surface 34*b* of the mounting member 30 includes a pair of longitudinally extending channels 48 proximate the first and second lateral edges 40*a*, 40*b* extending outwardly from the outer surface 34*a* of the mounting member 30. The channels 48 are generally rectangularly shaped in cross-section and preferably extend the entire length of the mounting member 30. The channels 48 each include a slot 50 also preferably extending the entire length thereof. A finger 52 extends from each of the lateral edges 40*a*, 40*b* of the sheath 38 inwardly from the interior surface 42*a* of the sheath 38. Each of the fingers 52 has a first portion which is shaped to complement the slots 50 and a second portion which is generally triangularly shaped in cross-section and is sized to snap into and be captured within the hollow portion of the respective channels 48. The fingers 52 preferably extend the entire length of the sheath 38 to ensure that the first and second lateral edges 40*a*, 40*b* of the sheath 38 are securely attached to the mounting member 30.

It is understood by those skilled in the art that other methods could be used to releasably secure that first and second lateral edges 40*a*, 40*b* of the sheath 38 to the mounting member 30. For instance, the fingers 52 could be friction fit within the slots 50 or the channels 48 could be solid for receiving other standard fasteners. If desired, one (or both) of the first and second lateral edges 40*a*, 40*b* could be permanently secured to one of the channels 48 by depositing an adhesive (not shown) within the hollow portion of the channels 48 along with the finger 52 with the other of the lateral edges 40*a*, 40*b* being releasable.

The bi-directional sensing edge 14 is preferably used for detecting objects in proximity to the leading member 12 of the gate 10 and includes first and second switches 56*a*, 56*b*, each complementarily positioned within the second area 44, with the first switch 56*a* generally corresponding to the first portion 38*a* of the sheath 38 and the second switch 56*b* generally corresponding to the second portion 38*b* of the sheath 38. The first and second switches 56*a*, 56*b* cause actuation of the device or drive mechanism (discussed above) upon application of pressure to the exterior surface of the sheath 38. Each of the first and second switches 56*a*, 56*b* preferably is a force sensing switch positioned within the sheath 38 to sense objects in proximity to the leading member 12 of the gate 10, which are engaged by the sheath 38. In this way, application of pressure on the exterior surface 42*b* of the sheath 38, such as may be caused by the sheath 38 engaging an object, substantially anywhere along the first and second portions 38*a*, 38*b* respectively actuates one of the first and second switches 56*a*, 56*b*, which in turn, actuates the devices or drive mechanism, discussed above, in the appropriate manner. In order to facilitate description of the first and second switches 56*a*, 56*b*, a dashed line is shown in FIG. 2 generally along a "radial" center line of the bi-directional sensing edge 14 to separate the first switch and second switch sides of the sensing edge 14. Each of the components of the switches 56*a*, 56*b* described below is referred to as having an "a" portion corresponding to the first switch 56*a* and a "b" portion corresponding to the second switch 56*b*.

Referring to FIGS. 2-4, each of the first and second switches 56*a*, 56*b* comprises a first sheet of resiliently compressible material 58*a*, 58*b* which is positioned within the second area 44 and includes a first face and a second face. The first face of the first sheet of resiliently compressible material 58*a*, 58*b* is in engagement with the outer surface 34*a* of the mounting member 30. In the present embodiment, it is preferred that the first sheet of resiliently compressible material 58*a*, 58*b* and succeeding layers and sheets described hereinafter, be generally sized to complement the internal configuration of the second area 44. However, it is understood by those skilled in the art that the first sheet of resiliently compressible material 58*a*, 58*b* and succeeding layers and sheets can be sized as wide or narrow as desired and may be of any desired length for accommodating different structures and uses. In the present embodiment, it is preferred that the first sheet of resiliently compressible material 58*a*, 58*b* be constructed of generally soft foam rubber. It is understood by those skilled in the art that the first sheet of resiliently compressible material 58*a*, 58*b* can be constructed of either closed-space or open-cell foam rubber or other materials having similar properties.

Proximate the first sheet of resiliently compressible material 58*a*, 58*b* is a first sheet of flexible, electrically conductive material 60*a*, 60*b*, engaged therewith, and having a first face and a second face. The first face of the first sheet of flexible, electrically conductive material 60*a*, 60*b* is in engagement with the second face of the first sheet of resiliently compressible material 58*a*, 58*b*. In the present embodiment, it is preferred that the first sheet of flexible, electrically conductive material 60*a*, 60*b* be generally thin and preferably be constructed of aluminum or aluminum foil. However, it is within the spirit and scope of the present invention to construct the first sheet of flexible, electrically conductive material 60*a*, 60*b* of other conductive materials, such as copper, brass, or an alloy thereof. Although referred to as a single sheet for the sake of convenience, the first sheet of flexible, electrically conductive material 60*a*, 60*b* is preferably separated by a first gap 61 into two separate sheets, one first sheet of flexible, electrically conductive material 60*a* for the first switch 56*a* and another first sheet of flexible, electrically conductive material 60*b* for the second switch 56*b*. In this way, the first and second switch 56*a*, 56*b* portions of the first sheet of flexible, electrically conductive material 60*a*, 60*b* are electrically isolated from one another.

An electrical conductor or wire (not shown in this embodiment but similar to first and second wires 84*a*, 84*b* shown in FIG. 6 with respect to the first alternate embodiment) is electrically connected to the first sheet of flexible, electrically conductive material 60*a*, 60*b* for each of the first and second switches 56*a*, 56*b* preferably by soldering at one end thereof. That is, the first wire is electrically connected to the first sheet of flexible, electrically conductive material 60*a* for the first switch 56*a*, and the second wire is electrically connected to the first sheet of flexible, electrically conductive material 60*b* for the second switch 56*b*. The electrical conductors are used in connection with a circuit (not shown) for controlling the actuation of the device, as is understood by those skilled in the art, in response to the application of force to the sheath 38, as described hereinafter. It is also understood by those skilled in the art that a plurality of conductors or wires could be electrically connected to the first sheet of flexible, electrically conductive material 60*a*, 60*b* to provide a redundancy feature.

The first sheet of flexible, electrically conductive material 60*a*, 60*b* is in engagement with a layer of non-conductive material 62*a*, 62*b* having a first face and a second face for spacing apart the first sheet of flexible, electrically conductive material 60*a*, 60*b* and a second sheet of flexible, electrically conductive material 64*a*, 64*b*. The layer of non-conductive material 62*a*, 62*b* has at least one opening 66 extending therethrough between the first and second faces thereof. As shown in FIGS. 2-4, the layer of non-conductive material 62*a*, 62*b*, preferably includes a plurality of openings 66 interspaced therealong for allowing the actuation of the first and second switches 56*a*, 56*b* by applying pressure thereto, as described hereinafter. In the present embodiment, it is preferred that the opening 66 be generally circular in cross-section. However, it is within the spirit and scope of the present invention to configure the opening 66 in any geometric configuration, such as square-shaped or oval-shaped, for instance.

The layer of non-conductive material 62*a*, 62*b* is preferably constructed of a resiliently compressible material, such as generally soft foam rubber, for instance. It is understood by those skilled in the art that the layer of non-conductive materials 62*a*, 62*b* can be constructed of either closed- or open-cell foam rubber or other materials having similar properties, so long as the function of the first and second switches 56*a*, 56*b* is achieved, as described hereinafter.

The layer of non-conductive material 62*a*, 62*b* is in engagement with the second sheet of flexible, electrically conductive material 64*a*, 64*b* having a first face and a second face. The first face of the second sheet of flexible, electrically conductive material 64*a*, 64*b* is in engagement or corresponding facing relationship with the second face of the layer of non-conductive material 62*a*, 62*b*. In a similar manner as described above with respect to the first sheet of flexible, electrically conductive material 60*a*, 60*b*, the second sheet of flexible, electrically conductive materials 64*a*, 64*b* is preferably separated by a second gap 61 into two separate sheets, one second sheet of flexible, electrically conductive material 64*a* for the first switch 56*a* and another second sheet of flexible, electrically conductive material 64*b* for the second switch 56*b*, to electrically isolate the portions of the second sheet of flexible, electrically conductive materials 64*a*, 64*b* from one another.

In the present embodiment, it is preferred that the second sheet of flexible, electrically conductive material 64*a*, 64*b* be constructed of the same material and configuration as the first sheet of flexible, electrically conductive material 60*a*, 60*b*. Similarly, each portion of the second sheet of flexible, electrically conductive material 64*a*, 64*b* is connected to an electrical conductor or wire (not shown in this embodiment but similar to third and fourth wires 88*a*, 88*b* shown in FIG. 6 with respect to the first alternate embodiment) or a plurality thereof for connection with the circuit for controlling the actuation of the device in response to the application of force to the sheath 38.

In engagement with the second sheet of flexible, electrically conductive material 64*a*, 64*b* is a second sheet of resiliently compressible material 68*a*, 68*b* having a first face and a second face. The first face of the second sheet of resiliently compressible material 68*a*, 68*b* is in engagement or corresponding facing relationship with the second face of the second sheet of flexible, electrically conductive material 64*a*, 64*b*. The second face of the second sheet of resiliently compressible material 68*a*, 68*b* is in engagement with the interior surface 42*a* of the sheath 38. The second sheet of resiliently compressible material 68a, 68b is preferably constructed of the same material and configured generally identically to the first sheet of resiliently compressible material 58a, 58b. However, it is apparent to those skilled in the art that the first and second sheets of resiliently compressible material 58a, 58b, 68a, 68b can differ in configuration, size, and/or material.

As shown in FIG. 2, the first and second sheets of flexible, electrically conductive material 60a, 60b, 64a, 64b are spaced apart by the layer of non-conductive material 62a, 62b and present equal opposed portions to each other through the openings 66. Upon the application of force to the sheath 38, a portion of at least one of the first and second sheets of flexible, electrically-conductive material 60a, 60b, 64a, 64b deflects into at least one of the openings 66 in the layer of non-conductive material 62a, 62b and makes electrical contact between the first and second sheets of flexible, electrically conductive material 60a, 60b, 64a, 64b to thereby close or open an electrical circuit to actuate the device to effect a desired result. Preferably, the desired result is that movement of the gate 10 in the first direction X is effected when the second switch 56b is actuated and movement of the gate 10 in the second direction Y is effected when the first switch 56a is actuated. Alternatively, the device could cause the gate 10 to stop moving, regardless of the direction of travel of the gate 10, if either one or both of the first and second switches 56a, 56b is/are actuated.

While it is preferred that the sensing edge 14 include first and second switches 56a, 56b that are force sensing, as described above, it is understood by those skilled in the art that the present invention is not limited to any particular type of switch. For instance, the first and second switches could be of the type disclosed in U.S. Pat. Nos. 3,462,885; 4,785,143; 4,908,483; and 4,920,241, all of which are hereby incorporated by reference. Moreover, it is within the spirit and scope of the present invention that there be more than two switches within the sensing edge if so desired.

Although each of the components of the first and second switches 56a, 56b have been discussed as being separate, it is noted that only the first and second sheets of resiliently conductive material 60a, 60b, 64a, 64b require spacing therebetween to ensure electrical isolation thereof so that only the first or second switch 56a, 56b is actuated with application of pressure on the exterior surface 42b of the sheath 38 anywhere along the first or second portion 38a, 38b, respectively. As such, only the first and second sheets of flexible electrically conductive material 60a, 60b, 64a, 64b are shown with respective first and second gaps 61, 65 therebetween in order to electrically isolate the first and second sheets of flexible electrically conductive material 60a, 64a of the first switch 64a from the first sheet of flexible electrically conductive material 60b, 64b of the second switch 64b. The first sheet of resiliently compressible material 58a, 58b, the layer of non-conductive material 62, 62b, and the second sheet of resiliently compressible material 68a, 68b each are shown as continuous components and are only referred to as being separate components in order to clearly portray which parts of what components are associated with each of the first and second switches 56a, 56b. However, it should be understood by those skilled in the art that each of the components could also be separated by gaps so that each of the first and second switches 56a, 56b include separate and distinct components. Moreover, while it is preferred that the first and second sheets of flexible electrically conductive material 60a, 60b, 64a, 64b are separated by first and second gaps 61, 65, respectively, it is within the spirit and scope of the present invention that the first and second sheets of flexible electrically conductive materials 60a, 60b, 64a, 64b of each of the first and second switches 56a, 56b be electrically isolated from one another in a different way.

In the preferred embodiment, the first and second gaps 61, 65 are preferably approximately ¼ of an inch long. In other words, the first switch 56a portions of the first and second sheets of electrically conductive material 60a, 64a are preferably separated from the second switch 56b portions of the first and second sheets of electrically conductive material 60b, 64b by ¼ of an inch. However, one with ordinary skill in the art would recognize that the lengths of the gaps 61, 65 could be varied so long as the first switch 56a portions of the first and second sheets of electrically conductive material 60a, 64a are electrically isolated from the second switch 56b portions of the first and second sheets of electrically conductive material 60b, 64b.

Referring to FIG. 4, each longitudinal end of the sensing edge 14 preferably includes end plugs 15 attached thereto. The shape of the end plugs 15 is preferably substantially identical to the cross-sectional area of the sensing edge 14. The end plugs 15 are preferably mechanically attached to the ends of the sensing edge 14. In the preferred embodiment, the end plugs 15 are molded onto the cross-section of the sensing edge 14 providing a waterproof seal. One with ordinary skill in the art would recognize that the end plugs 15 could be attached to the cross-section of the sensing edge 14 by other means, such as using an adhesive.

Preferably, at least some, if not all, of the above-described components of the first and second switches 56a, 56b are engaged to one another using layers of adhesive therebetween. Each of the layers of adhesive is preferably polyester film with acrylic adhesive on each side thereof. The sensing edge 14 preferably further includes a vapor barrier therein to enclose the components of the first and second switches 56a, 56b. The vapor barrier is preferably constructed of vinyl, although one with ordinary skill in the art would recognize that any flexible, non-conductive material could be substituted. While it is preferred that the sensing edge 14 include layers of adhesive and a vapor barrier, such a configuration is not intended to be limiting. As such, it is within the spirit and scope of the present invention that the sensing edge 14 not include layers of adhesive and/or a vapor barrier, or that other means be used to adhere successive layers of the switches or create a vapor barrier within the sensing edge, provided the sensing edge is still capable of functioning as described herein.

Referring now to FIGS. 5 and 6, there is shown a bi-directional sensing edge 14 in accordance with a first alternate embodiment of the invention. The first alternate embodiment is directed to a gate having a leading member 12 which is generally in the form of a parallelogram in cross-section. The sensing edge 14 in accordance with the first alternate embodiment is generally identical to the sensing edge 14 described above in connection with the preferred embodiment, except that the mounting member 30 is configured to complement the different shape of the leading member 12. That is, the mounting member 30 includes a mounting plate 70 having a first end 70a, a second end 70b, an inner surface 70c, and an outer surface 70d. A first elongated clamping member 72 extends from the first end 70a of the mounting plate 70 to thereby form an angle therebetween. A second elongated clamping member 74 extends from the second end 70b of the mounting plate 70 to thereby form an angle therebetween. The first and second clamping members 72, 74 each include an inner surface 72a, 74a and an outer surface 72b, 74b. The mounting plate 70, first clamping member 72, and second member 74 are generally trihedrally-shaped in cross-section such that the inner surfaces 70*c*, 72*a*, 74*a* thereof define a first area 76 for receiving in facing engagement a portion of the leading member 12.

The first clamping member 72 is spaced from the second clamping member 70 for a distance which is less than the maximum lateral distance D of the leading member 12. The mounting member 30 is constructed of a material having a sufficient degree of flexibility to allow the clamping member 72, 74 of the mounting member 30 to move toward and away from each other such that the leading member 12 can be snap-fit within the first area 76 to thereby grip and secure the sensing edge 14 to the leading member 12. As in the preferred embodiment, the first alternate embodiment can also include screws 46 for further securing the sensing edge 14 to the leading member 12.

Referring to FIG. 6, first, second, third, and fourth electrical conductors or wires 84*a*, 84*b*, 88*a*, 88*b* extend outwardly from the outer sheath 38. The wires 84*a*, 84*b*, 88*a*, 88*b* are preferably electrically connected to the first and second sheets of flexible electrically conductive materials 60*a*, 60*b*, 64*a*, 64*b* in the manner described above with respect to the preferred embodiment. Preferably, the first and third wires 84*a*, 88*a* extend through a first 90 degree elbow 80*a* exiting from the first portion 38*a* of the sheath 38, and the second and fourth wires 84*b*, 88*b* extend through a second 90 degree elbow 80*b* exiting from the second portion 38*b* of the sheath 38. Although this is preferred, it is within the spirit and scope of the present invention that the wires 84*a*, 84*b*, 88*a*, 88*b* exit from the sensing edge 14 in a different manner provided the wires 84*a*, 84*b*, 88*a*, 88*b* and sensing edge 14 are still capable of performing in the manner described herein. The wires 84*a*, 84*b*, 88*a*, 88*b* are preferably each insulated with first, second, third, and fourth wire covers 82*a*, 82*b*, 86*a*, 86*b*, respectively.

It is noted that the bi-directional sensing edge 14 shown in FIG. 6 includes first and second switches 56*a*, 56*b* that extend substantially to the first and second lateral edges 40*a*, 40*b*, respectively, of the sheath 38, as opposed to leaving an open area between an edge of each of the first and second switches 56*a*, 56*b* and the first and second lateral edges 40*a*, 40*b*, respectively, as is shown with the embodiments of the sensing edges 14 shown in FIGS. 2, 3, 5, and 7. By extending the switches 56*a*, 56*b* in this manner, a larger sensing area for the sensing edge 14 is provided. If desired, such an arrangement can be provided in the sensing edge 14 of any of the embodiments disclosed herein without departing from the broad inventive concepts thereof.

Referring now to FIG. 7, there is shown a bi-directional sensing edge 14 in accordance with a second alternate embodiment of the present invention. The sensing edge 14 of the second alternate embodiment is generally identical to the sensing edge 14 described above in connection with the first alternate embodiment shown in FIGS. 5 and 6, except that the first and second clamping member 72, 74 and associated elements of the first and second switches 56*a*, 56*b* extend a greater distance around the leading member 12 to provide a greater sensing area. Accordingly, further description of the second alternate embodiment is omitted for purposes of convenience only and is not limiting.

In use, an appropriately shaped bi-directional sensing edge 14 is selected for use with a particularly shaped leading member 12 of a gate 10. The sensing edge 14 is then snap-fit to the leading member 12 of the gate 10 and further fastening elements, such as screws 46, are used, if desired. The sensing edge 14 is then connected to suitable control circuitry. Since the sensing edge 14 extends around a significant portion of the leading member 12, the sensing edge 14 senses objects which approach or are approached by the leading member 12 at a wide angle, such as 180 degrees, regardless of whether the gate 10 is pivotally, vertically, or horizontally mounted for movement. Upon the application of force to the sheath 38 by engagement with an object, depending on whether the force is applied to the first or second portion 38*a*, 38*b* thereof, a portion of at least one of the first and second sheets of flexible, electrically conductive materials 60*a*, 60*b*, 64*a*, 64*b* deflects into at least one of the openings 66 in the layer of non-conductive material 62*a*, 62*b* and makes electrical contact between the first and second sheets of electrically conductive material 60*a*, 60*b*, 64*a*, 64*b* to thereby close or open an electrical circuit to actuate one of the first and second switches 56*a*, 56*b* to appropriately actuate the device, as discussed above.

From the foregoing description, it can be seen that the present invention comprises a bi-directional sensing edge 14 for causing a moving gate 10 to move in the opposite direction by actuation of a device upon force being applied to the sensing edge 14. It would appreciated by those skilled in the art that changes could be made to the embodiments described above without departing from the broad inventive concepts thereof. It is understood, therefore, that this invention is not limited to the particular embodiments disclosed, but it is intended to cover all modifications which are within the spirit and scope of the invention as defined by the appended claims.

I claim:

1. A bi-directional sensing edge for a gate, the gate including a leading member having an external surface with at least first and second sides and a maximum lateral distance, the gate being movable in at least a first direction with the first side leading and a second direction with the second side leading, the sensing edge comprising:

- a mounting member for securing the sensing edge to the leading member of the gate, the mounting member including an outer surface and an inner surface defining a first area for receiving at least a portion of the leading member;
- an elongate outer sheath having at least first and second portions each respectively corresponding to the first and second sides of the leading member, the sheath further having an interior surface and an exterior surface, the interior surface of the sheath being spaced from the outer surface of the mounting member to thereby define a second area;
- a first switch positioned within the second area and corresponding to the first portion of the sheath for actuation of the first switch upon application of pressure on the exterior surface of the sheath substantially anywhere along the first portion; and
- a second switch positioned within the second area and corresponding to the second portion of the sheath for actuation of the second switch upon application of pressure on the exterior surface of the sheath substantially anywhere along the second portion.

2. A sensing edge according to claim 1, wherein the inner surface of the mounting member is sized and shaped to extend around at least a portion of the external surface of the leading member having the maximum lateral distance.

3. A sensing edge according to claim 2, wherein the mounting member includes first and second lateral edges spaced apart a distance less than the maximum lateral distance of the leading member, the mounting member being constructed of a material having a sufficient degree of flexibility to allow the first and second lateral edges of the mounting member to move toward and away from each other such that the maximum lateral distance portion of the leading member can be snap fit within the first area to thereby grip and secure the sensing edge to the leading member.

4. A sensing edge according to claim 3, wherein the material is polyvinyl chloride.

5. A sensing edge according to claim 1, wherein the sheath includes first and second lateral edges spaced apart and secured to the mounting member proximate first and second lateral edges of the mounting member.

6. A sensing edge according to claim 5, wherein the first and second lateral edges of the sheath are releasably secured to the mounting member.

7. A sensing edge according to claim 1, wherein each of the first and second switches further comprises:

a first sheet of resiliently compressible material having a first face and a second face, the first face of the first sheet of resiliently compressible material being in corresponding facing engagement with a portion of the outer surface of the mounting member;

a first sheet of flexible, electrically conductive material having a first face and a second face, the first face of the first sheet of flexible, electrically conductive material being in corresponding facing engagement with the second face of the first sheet of resiliently compressible material;

a layer of non-conductive material having a first face and a second face, the first face of the layer of non-conductive material being in corresponding facing engagement with the second face of the first sheet of flexible, electrically conductive material, the layer of non-conductive material including at least one opening extending therethrough between the first and second faces thereof;

a second sheet of flexible, electrically conductive material having a first face and a second face, the first face of the second sheet of flexible, electrically conductive material being in corresponding facing engagement with the second face of the layer of non-conductive material; and a second sheet of resiliently compressible material having a first face and a second face, the first face of the second sheet of resiliently compressible material being in corresponding facing engagement with the second face of the second sheet of flexible, electrically conductive material, the second face of the second sheet of resiliently compressible material being in corresponding facing engagement with the interior surface of the sheath, the first and second sheets of flexible, electrically conductive material being spaced apart by the layer of non-conductive material and presenting opposed portions to each other through the opening, whereby, upon the application of force substantially anywhere along the exterior surface of the sheath, a portion of at least one of the first and second sheets of flexible, electrically conductive material of one of the first and second switches deflects into the opening in the layer of non-conductive material and makes electrical contact between the first and second sheets of flexible, electrically conductive material to thereby actuate one of the first and second switches to effect a desired result.

8. A sensing edge according to claim 7, wherein the layer of non-conductive material is constructed of a resiliently compressible material.

9. A sensing edge according to claim 1, wherein movement of the gate in the first direction is effected when the second switch is actuated and movement of the gate in the second direction is effected when the first switch is actuated.

10. A sensing edge according to claim 1, wherein the mounting member is generally C-shaped in cross-section.

11. A sensing edge according to claim 1, wherein the mounting member is generally trihedral in cross-section.

* * * * *